United States Patent
Ogawa et al.

(10) Patent No.: US 8,219,290 B2
(45) Date of Patent: Jul. 10, 2012

(54) CONTROL APPARATUS FOR TRANSMISSION

(75) Inventors: Yasufumi Ogawa, Chiyoda-ku (JP);
Shiro Yonezawa, Chiyoda-ku (JP);
Takeru Okabe, Chiyoda-ku (JP);
Osamu Ishikawa, Chiyoda-ku (JP);
Tomohisa Shoda, Chiyoda-ku (JP);
Nozomu Kamioka, Chiyoda-ku (JP);
Masaki Horii, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 746 days.

(21) Appl. No.: 12/342,963

(22) Filed: Dec. 23, 2008

(65) Prior Publication Data

US 2009/0265066 A1    Oct. 22, 2009

(30) Foreign Application Priority Data

Apr. 17, 2008    (JP) ................. 2008-107832

(51) Int. Cl.
*G06F 7/00*    (2006.01)
(52) U.S. Cl. ............... 701/51; 701/55; 701/66; 701/79; 475/198
(58) Field of Classification Search .......... 701/51, 701/55, 65, 66, 74, 79, 93; 475/198, 199, 475/220, 298
See application file for complete search history.

(56) References Cited

U.S. PATENT DOCUMENTS 5,501,292 A * 3/1996 Kawashima et al. ......... 180/220
2009/0183777 A1* 7/2009 Herman et al. .................. 137/2

FOREIGN PATENT DOCUMENTS

| JP | 2002-369578 A | 12/2002 |
| JP | 2005-151790 A | 6/2005 |
| JP | 2006-200603 A | 8/2006 |
| JP | 2007-170545 A | 7/2007 |
| JP | 2007-177878 A | 7/2007 |
| JP | 2008-014323 A | 1/2008 |

OTHER PUBLICATIONS

Japanese Office Action dated Apr. 20, 2010 corresponding to Japanese Application No. 2008-107832.

* cited by examiner

*Primary Examiner* — Gertrude Arthur Jeanglaude
(74) *Attorney, Agent, or Firm* — Sughrue Mion, PLLC

(57) ABSTRACT

When a gear change has been decided, the coil resistance value of a motor which manipulates the transmission is measured. The coil temperature of the motor is estimated from the measured coil resistance value of the motor. In a case where the estimated coil temperature of the motor has been decided to be a predetermined temperature or above, the speed change inhibition time period of the transmission is calculated, and the speed change of the transmission is inhibited during the calculated speed change inhibition time period.

10 Claims, 10 Drawing Sheets

CONTROL APPARATUS FOR TRANSMISSION

BACKGROUND OF THE INVENTION

1. Field of the Invention

This invention relates to a control apparatus for a transmission as controls the transmission carried on an automobile or the like vehicle. More particularly, it relates to a control apparatus for a transmission in which a speed change control is performed by a motor.

2. Description of the Related Art

Heretofore, there has been known a transmission which is carried on an automobile or the like vehicle and in which a speed change control is performed by a motor. The transmission carries out a speed change in such a way that, in a twin-clutch type transmission, a shift fork is manipulated by two motors, thereby to select a gear which transmits power (refer to, for example, Patent Document 1 being JP-A-2007-177878, Sector 0018 and FIG. 1).

Besides, a technique for estimating the coil temperature of a motor has heretofore been known. More specifically, a predetermined voltage is applied across motor terminals immediately after the stop of the drive of the motor, the coil resistance value of the motor is calculated from the applied voltage and a current which flows through the motor at that time, and the coil temperature of the motor is estimated using the calculated coil resistance of the motor and the coil temperature characteristic of the motor (refer to, for example, Patent Document 2 being JP-A-2005-151790, Column of Abstract and FIG. 2).

In a control apparatus for a transmission as controls the transmission which carries out the speed change by the motors, like the related art transmission disclosed in Patent Document 1, when speed changes occur frequently on account of sport traveling or the like, currents frequently flow through the coils of the motors (hereinbelow, termed "motor coils"), and the temperatures of the motor coils rise. When currents are caused to flow through the motors by further continuing speed changes in this state, the temperatures of the motor coils reach a critical temperature, to pose the problem that the motor coils burn.

Besides, in a case where the speed change is carried out by utilizing the motor, one motor needs to be driven a plurality of times for one time of speed change. Therefore, in a case where the temperature detection technique for a motor coil as disclosed in Patent Document 2 is applied to a control apparatus for a transmission, a plurality of temperature measurements are performed for one time of speed change, thereby to pose the problem that a power consumption enlarges. Further, since the plurality of temperature measurements are performed, there is the problem that the temperature rise of the motor oil enlarges due to currents flowing in the temperature measurements, leading to the burning of the motor coil.

SUMMARY OF THE INVENTION

This invention has been made in order to solve the above problems, and it has for its object to provide a control apparatus for a transmission as prevents the temperature of a motor coil from becoming higher than a critical temperature and as prevents the motor coil from burning.

A control apparatus for a transmission according to this invention consists in a control apparatus for a transmission in which a speed change control is performed by a motor, including gear change end decision means for deciding if the transmission has undergone a gear change; coil resistance measurement means for measuring a coil resistance value of the motor which manipulates the transmission, in a case where the gear change end decision means has decided that the gear change has ended; coil temperature estimation means for estimating a coil temperature of the motor from the coil resistance value of the motor as measured by the coil resistance measurement means; high-temperature decision means for deciding the coil temperature of the motor as estimated by the coil temperature estimation means; and speed change inhibition time calculation means for calculating a speed change inhibition time period of the transmission in a case where the high-temperature decision means has decided that the coil temperature of the motor is, at least, a predetermined temperature. Here, a speed change of the transmission is inhibited during the speed change inhibition time period calculated by the speed change inhibition time calculation means.

In accordance with the control apparatus for the transmission according to this invention, the speed change is inhibited in a case where the temperature of a motor coil has come near to a critical temperature. Therefore, it is avoidable that the temperature of the motor coil becomes higher than the critical temperature, and the motor coil can be prevented from burning.

The foregoing and other objects, features, aspects and advantages of this invention will become more apparent from the following detailed description of this invention when taken in conjunction with the accompanying drawings.

DESCRIPTION OF THE PREFERRED EMBODIMENT

Now, the preferred embodiment of a control apparatus for a transmission according to this invention will be described with reference to the accompanying drawings. Incidentally, this invention shall not be especially restricted by the embodiment.

The embodiment will be described below by exemplifying a case where the control apparatus for the transmission according to this invention is applied to an automatic transmission.

Figure 1:
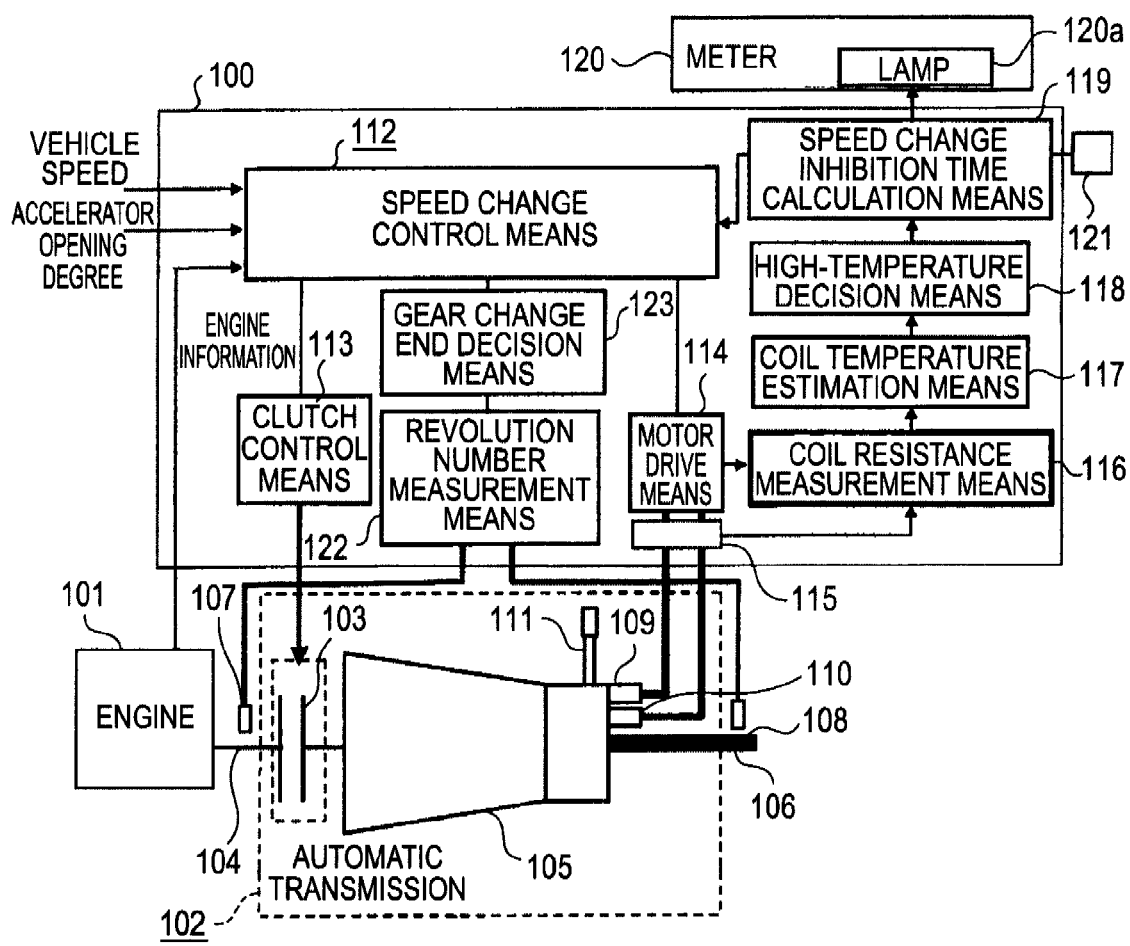
FIG. 1 is a diagram for explaining a control apparatus for a transmission according to an embodiment of this invention.

FIG. 1 is a diagram for explaining a control apparatus for a transmission according to an embodiment of this invention. Referring to FIG. 1, numeral 100 designates the control apparatus for the transmission, and numeral 101 designates an engine. Besides, numeral 102 designates an automatic transmission. A clutch 103 which transmits power from the engine 101 is mounted on the input part of the automatic transmission 102. The power of the engine 101 is transmitted from an input shaft 104 to a shift mechanism 105 for altering the shift stage of the automatic transmission 102, through the clutch 103, so as to transmit the power from an output shaft 106 to wheels (not shown). Incidentally, the revolution number of the input shaft 104 is measured by a revolution number sensor 107, while the revolution number of the output shaft 106 is measured by a revolution number sensor 108.

In contrast to a manual transmission, the automatic transmission 102 is an automatic manual transmission in which a speed change is performed by an actuator. The automatic manual transmission has a structure in which a shift stage is changed-over in such a way that a shift lever 111 is manipulated by a shift direction motor 109 and a select direction motor 110.

Speed change control means 112 determines the shift stage from information items such as a vehicle speed, an accelerator opening degree and an engine revolution number, and it gives the commands of the speed change to clutch control means 113 and motor drive means 114. The clutch control means 113 controls the engagement and release of the clutch 103 in compliance with the command received from the speed change control means 112. Besides, the motor drive means 114 manipulates the shift direction motor 109 or the select direction motor 110 so as to perform the speed change in compliance with the speed change command received from the speed change control means 112. Incidentally, a hydraulic control valve or a motor, for example, is used as the actuator for controlling the clutch 103, and brushless motors of 120-degree conduction type are used as the shift direction motor 109 and the select direction motor 110.

The motor drive means 114 applies a constant voltage at a degree at which the shift direction motor 109 or select direction motor 110 does not revolve, to this shift direction motor 109 or select direction motor 110. Motor current measurement means 115 measures a current which flows through the shift direction motor 109 or select direction motor 110 at that time.

In coil resistance measurement means 116, a motor coil resistance is measured in conformity with the Ohm's law on the basis of the constant voltage value applied to the shift direction motor 109 or select direction motor 110, and the motor current measured by the motor current measurement means 115. Incidentally, the motor current measurement means 115 is configured of a current sensor, for example, a current transformer.

Motor coil temperature estimation means 117 estimates a motor coil temperature on the basis of the motor coil resistance value measured by the coil resistance measurement means 116, and the relationship between the motor coil resistance value and the motor coil temperature as will be stated later.

High-temperature decision means 118 decides if the motor coil temperature estimated by the coil temperature estimation means 117 is a predetermined temperature or above. In a case where the estimated temperature is the predetermined temperature or above, a speed change inhibition time period is calculated by a speed change inhibition time calculation means 119. The speed change inhibition time period calculated by the speed change inhibition time calculation means 119 is outputted to the speed change control means 112, and it is set as a speed change inhibition time in the speed change control means 112. Besides, the speed change inhibition time period calculated by the speed change inhibition time calculation means 119 is outputted to a meter 120, and it is notified to the driver of an automobile in such a way that indication means, for example, a lamp 120a within the meter 120 is lit up during this speed change inhibition time period. Incidentally, a temperature inside an engine room accommodating the engine 101 therein as is detected by engine room temperature measurement means for measuring the temperature of the engine room, for example, a temperature sensor 121 is also considered for the calculation of the speed change inhibition time period by the speed change inhibition time calculation means 119.

Further, revolution number measurement means 122 measures the revolution number of the input shaft 104 as detected by the revolution number sensor 107 and the revolution number of the output shaft 106 as detected by the revolution number sensor 108. Gear change end decision means 123 calculates an estimated revolution number from the reduction ratio of a gear which is transmitting the revolution number power of the input shaft 104, as will be stated later.

Here, as shown in FIG. 1, the automatic transmission 102 is configured including the clutch 103, the shift mechanism 105, the shift direction motor 109, the select direction motor 110 and the shift lever 111. Besides, the control apparatus 100 for the transmission is configured including the speed change control means 112, the clutch control means 113, the motor drive means 114, the motor current measurement means 115, the coil resistance measurement means 116, the coil temperature estimation means 117, the high-temperature decision means 118, the speed change inhibition time calculation means 119, the revolution number measurement means 122 and the gear change end decision means 123.

Figure 2:
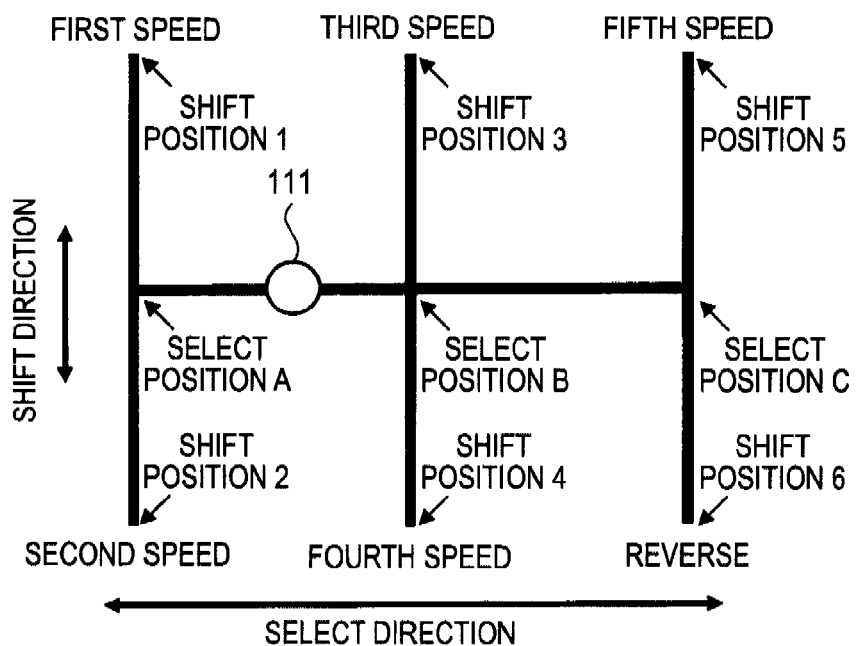
FIG. 2 is a diagram for explaining the details of a shift lever.

FIG. 2 is a diagram for explaining the details of the shift lever 111. The shift lever 111 is manipulated by the shift direction motor 109 or the select direction motor 110 (refer to FIG. 1). A first speed gear is engaged in a case where the shift lever 111 has been moved to a shift position 1, a second speed gear is engaged in a case where it has been moved to a shift position 2, a third speed gear is engaged in a case where it has been moved to a shift position 3, a fourth speed gear is engaged in a case where it has been moved to a shift position 4, a fifth speed gear is engaged in a case where it has been moved to a shift position 5, and a reverse gear is engaged in a case where it has been moved to a shift position 6. Besides, a neutral state in which any of the gears is not engaged is established in a case where the shift lever 111 has been moved to a select position A, a select position B or a select position C.

Figure 3:
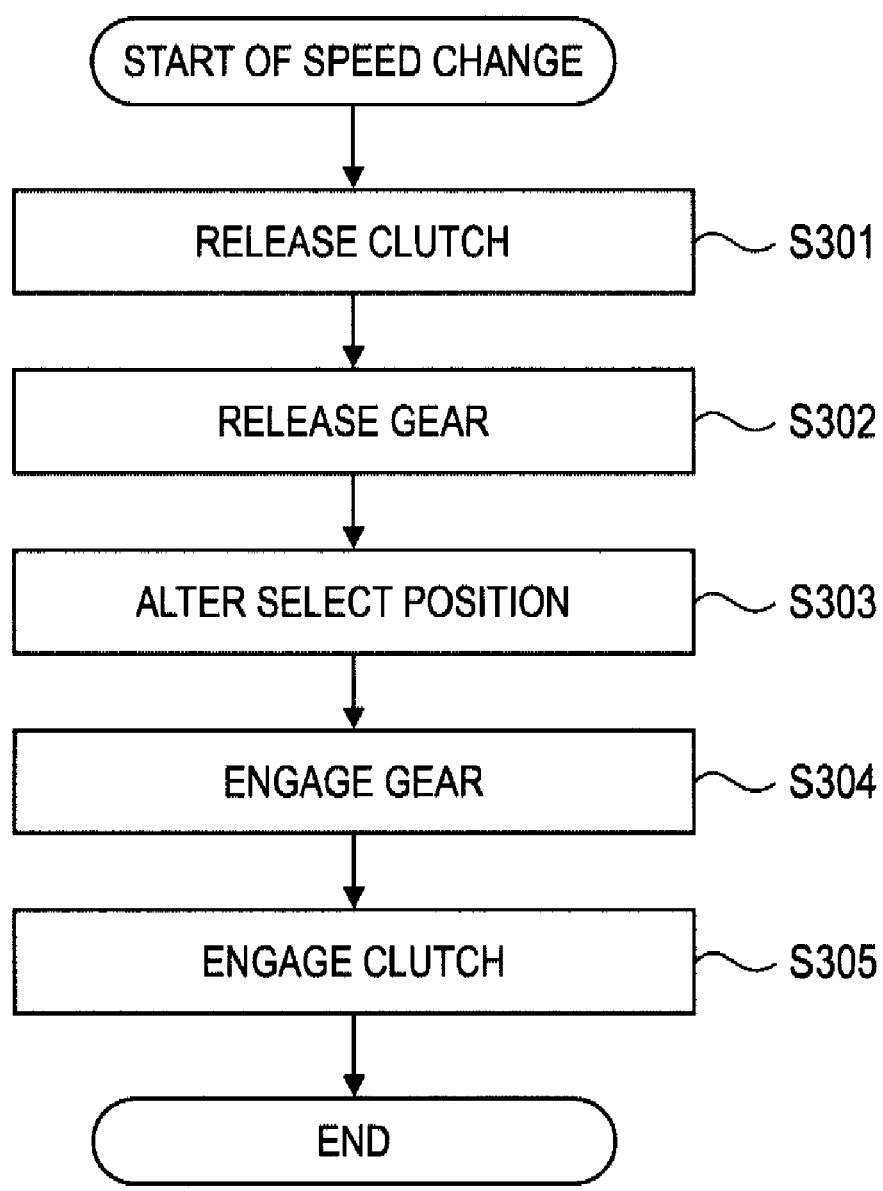
FIG. 3 is a flow chart showing a flow in the case of a gear change to a third speed during traveling at a second speed.

FIG. 3 is a flow chart showing a flow in the case where, while the automobile is traveling at the second speed, a gear change to the third speed is performed. During the traveling at the second speed, the shift lever 111 lies at the shift position 2.

Referring to FIG. 3, at a step S301, the clutch 103 is released by the clutch control means 113 in order to alter the shift stage.

At a step S302, the shift lever 111 lying at the shift position 2 is moved to the select position A by the shift direction motor 109. The first speed gear is released by moving the shift lever 111 to the select position A, and the neutral state is established.

At a step S303, the shift lever 111 is moved to the select position B by the select direction motor 110.

At a step S304, the shift lever 111 is moved to the shift position 3 by the shift direction motor 109. The third speed gear, not shown, is engaged by moving the shift lever 111 to the shift position 3, and the shift stage becomes the third speed.

At a step S305, the clutch 103 is engaged by the clutch control means 113. Then, the speed change operation is ended.

Figure 4:
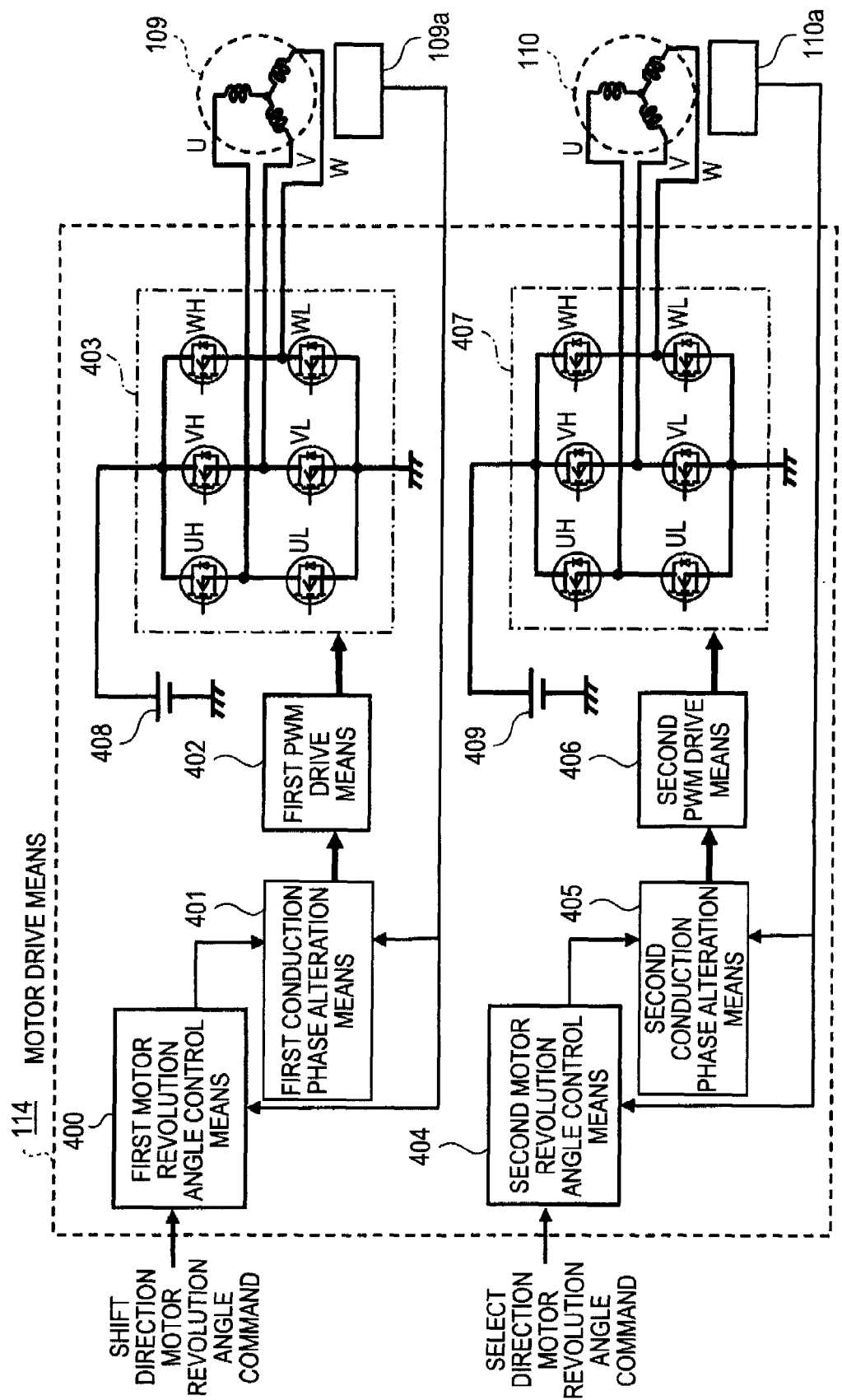
FIG. 4 is a diagram for explaining the detailed configuration of motor drive means.

FIG. 4 is a diagram for explaining the detailed configuration of the motor drive means 114. Referring to FIG. 4, the shift direction motor 109 or the select direction motor 110 is configured of the brushless motor of the 120-degree conduction type as stated before, and it is represented by a Y-connection. The revolution angle of the shift direction motor 109 is detected by a first Hall sensor 109a, while the revolution angle of the select direction motor 110 is detected by a second Hall sensor 110a.

First motor revolution angle control means 400 calculates a PWM drive duty so that the shift direction motor 109 may become a revolution angle calculated by the speed change control means 112. First conduction phase alteration means 401 alters a conduction phase in accordance with the pattern of the first Hall sensor 109a. First PWM drive means 402 selects any of transistors UH, UL, VH, VL, WH and WL constituting a first inverter 403, so that a current may flow through the conduction phase determined by the first conduction phase alteration means 401, and it turns ON/OFF the selected transistors at the PWM drive duty determined by the first motor revolution angle control means 400, thereby to control the revolution of the shift direction motor 109. In a case, for example, where it has been determined by the first conduction phase alteration means 401 that the current is caused to flow from a U-phase to a V-phase, the transistor UH constituting the first inverter 403 is PWM-driven, and the transistor VL is turned ON.

Second motor revolution angle control means 404 calculates a PWM drive duty so that the select direction motor 110 may become a revolution angle calculated by the speed change control means 112. Second conduction phase alteration means 405 alters a conduction phase in accordance with the pattern of the second Hall sensor 110a. Second PWM drive means 406 selects any of transistors UH, UL, VH, VL, WH and WL constituting a second inverter 407, so that a current may flow through the conduction phase determined by the second conduction phase alteration means 405, and it turns ON/OFF the selected transistors at the PWM drive duty determined by the second motor revolution angle control means 404, thereby to control the revolution of the select direction motor 110. In a case, for example, where it has been determined by the second conduction phase alteration means 405 that the current is caused to flow from a U-phase to a V-phase, the transistor UH constituting the second inverter 407 is PWM-driven, and the transistor VL is turned ON. Incidentally, the first inverter 403 is connected to a DC power source 408, and the second inverter 407 is connected to a DC power source 409.

Figure 5:
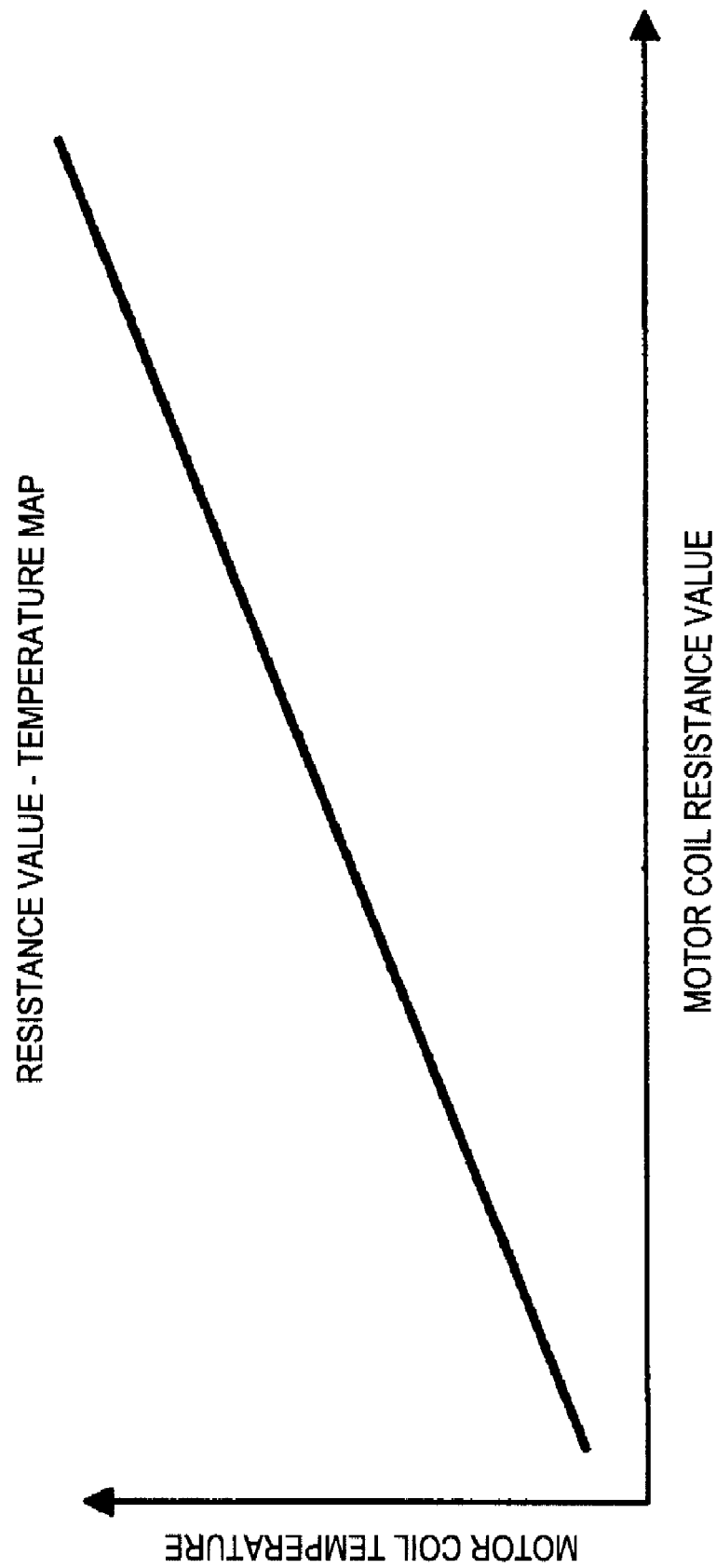
FIG. 5 is a diagram showing the relationship between a motor coil resistance and a motor coil temperature.

FIG. 5 is a diagram showing the relationship between a motor coil resistance value and a motor coil temperature. In FIG. 5, the relationship between the motor coil resistance value and the motor coil temperature is a straight line, but this relationship need not be limited to the straight line. It is known that the motor coil resistance value and the motor coil temperature have a correlation, and the motor coil temperature can be estimated by measuring the motor coil resistance value. Besides, the motor coil resistance value can be calculated from the Ohm's law when the terminal voltage of the motor and a current flowing through the motor are measured beforehand.

Figure 6:
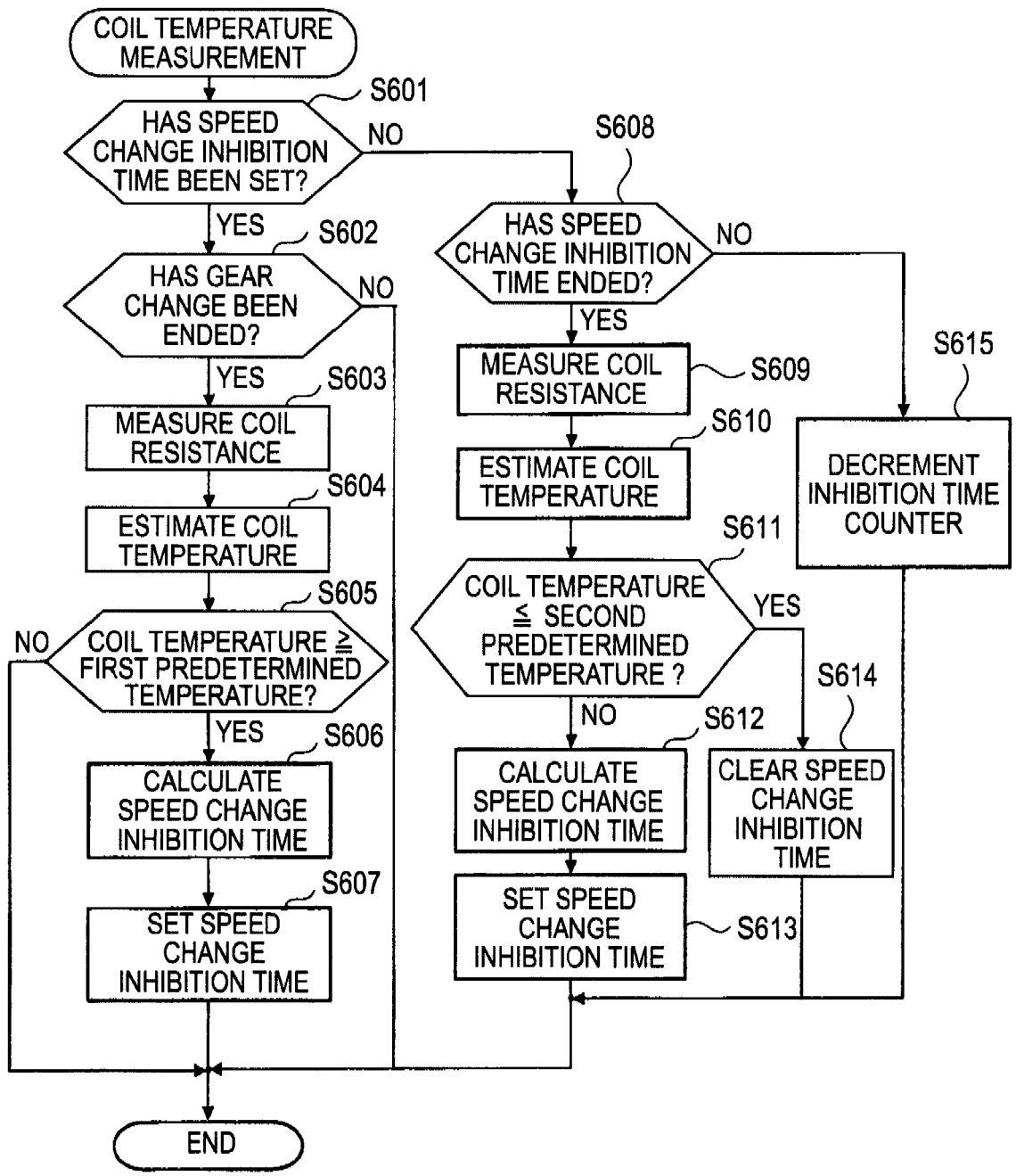
FIG. 6 is a flow chart for explaining the operation of the control apparatus for the transmission according to the embodiment.

Next, the operation of the control apparatus for the transmission according to the embodiment will be described. FIG. 6 is a flowchart for explaining the operation of the control apparatus for the transmission according to the embodiment. A coil temperature measurement logic shown in the flow chart is executed every fixed cycle, for example, 10 ms.

First, at a step S601, if a speed change inhibition time period has been set by the speed change control means 112 is checked. In the presence of the setting of the speed change inhibition time period, the measurement logic proceeds to a step S608, and in the absence of the setting, the measurement logic proceeds to a step S602.

At the step S602, if a gear change has been ended is decided by the gear change end decision means 123. Subject to the decision that the gear change has been ended, the coil temperature measurement logic proceeds to a step S603, and subject to the decision that the gear change has not been ended, the measurement logic is ended.

At the step S603, a constant voltage at a degree at which the shift direction motor 109 or the select direction motor 110 does not revolve is applied to this motor 109 or 110 by the motor drive means 114, and a current which flows through the shift direction motor 109 or the select direction motor 110 at that time is measured by the motor current measurement means 115. The coil resistance measurement means 116 measures a motor coil resistance in conformity with the Ohm's law on the basis of the constant voltage value applied to the shift direction motor 109 or the select direction motor 110, and the motor current measured by the motor current measurement means 115.

At a step S604, a motor coil temperature is estimated by the coil temperature estimation means 117 on the basis of the motor coil resistance value measured at the step S603, and the relationship between a motor coil resistance value and a motor coil temperature as shown in FIG. 5.

At a step S605, if the motor coil temperature estimated at the step S604 is a first predetermined temperature or above is decided by the high-temperature decision means 118. In a case where the motor coil temperature is the first predetermined temperature or above, the coil temperature measurement logic proceeds to a step S606, and in a case where the motor coil temperature is below the first predetermined temperature, the measurement logic is ended. Incidentally, the first predetermined temperature has its value determined from the characteristic of a motor coil so that the motor coil may not burn.

At the step S606, a speed change inhibition time period is calculated by the speed change inhibition time calculation means 119.

At a step S607, the speed change inhibition time period calculated at the step S606 is set by the speed change control means 112 so as to inhibit any speed change during the speed change inhibition time period.

As described above, the motor coil temperature is measured immediately after the end of the gear change of the automatic transmission 102, whereby one time of temperature measurement suffices for one time of speed change, and a power consumption at the temperature measurement can be lessened. Further, owing to one time of temperature measurement for one time of speed change, the rise of the motor coil temperature attributed to the temperature measurement lessens, and the possibility of leading to the burning of the motor coil can be lowered.

Besides, in a case where the motor coil temperature has come near to a critical temperature, the speed change is inhibited. Thus, it is avoidable that the motor coil temperature becomes higher than the critical temperature, and the motor coil can be prevented from burning.

Besides, at the step S608, if the speed change inhibition time period has ended is decided by the speed change control means 112. In a case where the speed change inhibition time period has ended, the measurement logic proceeds to a step S609, and in a case where the speed change inhibition time period has not ended, the measurement logic proceeds to a step S615.

At the step S609, a motor coil resistance value is measured by the coil resistance measurement means 116 in the same manner as at the step S603.

At a step S610, a motor coil temperature is measured from the motor coil resistance value in the same manner as at the step S604.

At a step S611, if the coil temperature measured at the step S610 is a second predetermined temperature or below is decided by the high-temperature decision means 118. In a case where the coil temperature is the second predetermined temperature or below, the measurement logic proceeds to a step S614, and in case where the motor coil temperature is higher than the second predetermined temperature, the measurement logic proceeds to a step S612. Incidentally, the second predetermined temperature should desirably be set at a value smaller than the first predetermined temperature.

At the step S612, a speed change inhibition time period is calculated by the speed change inhibition time calculation means 119 in the same manner as at the step S606.

At a step S613, any speed change is inhibited during the speed change inhibition time period calculated at the step S612, by the speed change control means 112 in the same manner as at the step S607.

At the step S614, the speed change inhibition time period is cleared to nullify the setting of this speed change inhibition time period. Besides, at the step S615, an inhibition time counter is decremented.

As described above, when the speed change inhibition time period has ended, the motor temperature is estimated again, and if the restart of the speed change poses no problem is decided. Thus, even in a case where the coil temperature has not lowered within the speed change inhibition time period under the influences of a motor case temperature, a temperature inside the engine room, etc., the coil burning of the shift direction motor 109 or the select direction motor 110 is preventable.

Figure 7:
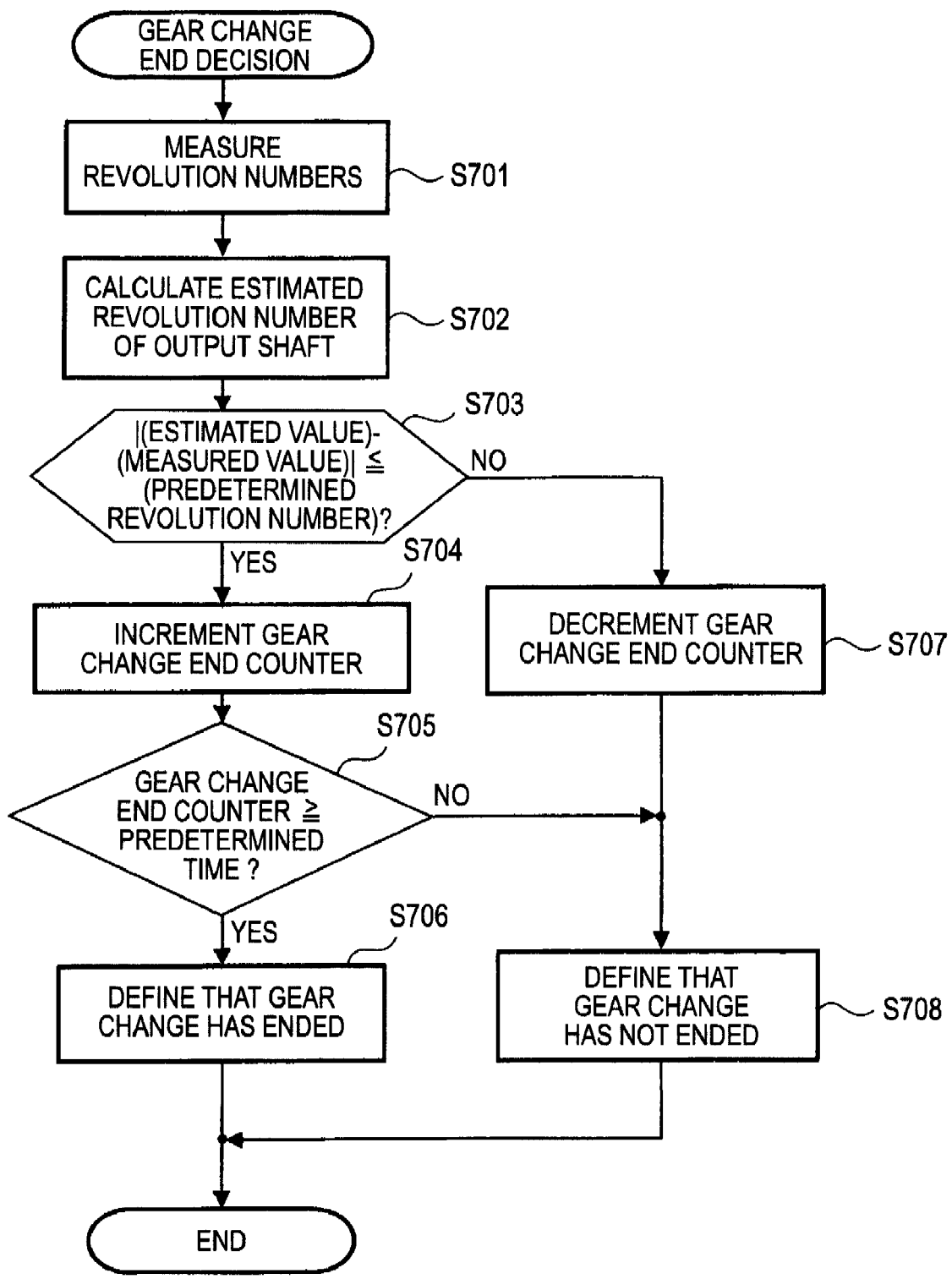
FIG. 7 is a flow chart for explaining the operation of gear change end decision means.

FIG. 7 is a flow chart for explaining the operation of the gear change end decision means 123. Referring to FIG. 7, at a step S701, the revolution number of the input shaft 104 and that of the output shaft 106 are respectively measured with the revolution number sensor 107 and the revolution number sensor 108 by the revolution number measurement means 122.

At a step S702, an estimated revolution number is calculated by the gear change end decision means 123 on the basis of the input shaft revolution number measured at the step S701, and the reduction ratio of a gear transmitting power. The estimated revolution number is expressed by the following Formula 1:

(Estimated revolution number)=(Input shaft revolution number)/(Reduction ratio)   (Formula 1)

At a step S703, if the absolute value of the difference between the estimated revolution number of the output shaft 106 and the output shaft revolution number measured at the step S701 is a predetermined revolution number or below is decided by the gear change end decision means 123. Subject to the decision that the absolute value of the difference is the predetermined revolution number or below, the routine proceeds to a step S704, at which a gear change end counter is incremented. Subject to the decision that the absolute value of the difference between the estimated revolution number and the output shaft revolution number is above the predetermined revolution number, the routine proceeds to a step S707, at which the gear change end counter is decremented.

At a step S705, if a gear change end decision counter indicates a predetermined time period or above is decided by the gear change end decision means 123. Subject to the decision that the gear change end decision counter is the predetermined time period or above, the routine proceeds to a step S706, and it is defined that a gear change has ended. Subject to the decision that the gear change end decision counter is below the predetermined time period, the routine proceeds to a step S708, and it is defined that the gear change has not ended yet.

Figure 8:
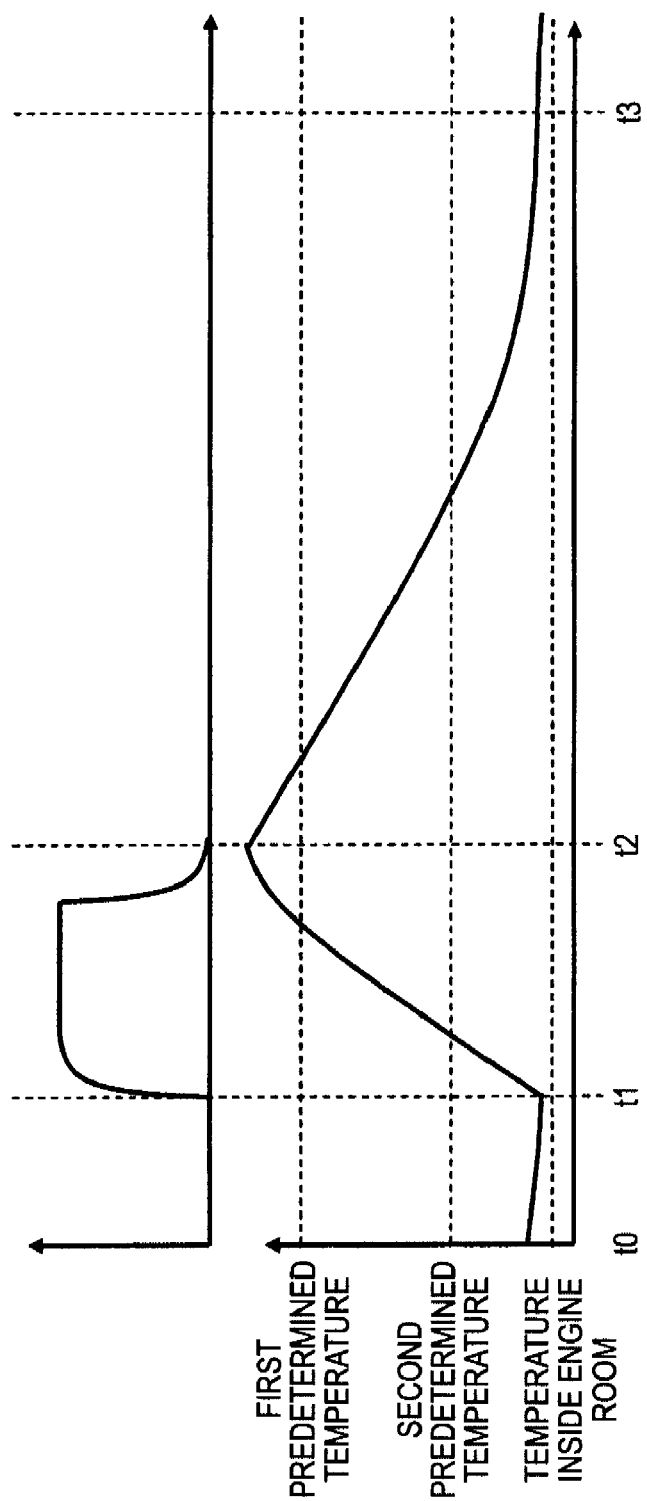
FIG. 8 is a time chart showing the changes of a current which flows through a shift direction motor, and the motor coil temperature.

FIG. 8 is a time chart showing the changes of a current which flows through the shift direction motor 109, and the motor coil temperature. In a period from a time t0 to a time t1, any current does not flow through the shift direction motor 109. Therefore, the motor coil temperature-lowers gradually and comes near to a temperature inside the engine room. In a period from the time t1 to a time t2, the shift direction motor 109 is driven, and the current flows through the shift direction motor 109. When the current flows through the shift direction motor 109, the motor coil temperature of this shift direction motor 109 rises. In a period from the time t2 to a time t3, any current does not flow through the shift direction motor 109, so that the motor coil temperature lowers gradually to come near to the temperature inside the engine room. The lowering of the motor coil temperature can be expressed by the following Formula 2 in conformity with the Newton's law of cooling:

$$C\text{coil}*dT\text{coil}/dt=-\lambda(T\text{coil}-T\text{eng})$$   (Formula 2)

Here, "Ccoil" denotes the thermal capacity of the motor coil, and $\lambda$ denotes a heat transfer rate. The thermal capacity and the heat transfer rate are known values measured beforehand. Besides, "Tcoil" denotes the motor coil temperature, "Teng" denotes the temperature inside the engine room, * denotes a multiplication, and "dTcoil/dt" denotes the time differential of the coil temperature Tcoil.

By solving a differential equation indicated by Formula 2, the motor coil temperature can be expressed by the following Formula 3:

$$T\text{coil}=(T0-T\text{eng})\exp(-\lambda/C\text{coil}*t)+T\text{eng}$$   (Formula 3)

Here, "T0" denotes an initial temperature, "exp( )" denotes an exponential function, and t denotes a time period.

From this formula, the time period in which the motor coil temperature Tcoil is lowered to a temperature T1 can be expressed by the following Formula 4:

$$t=-C\text{coil}/\lambda*\log[(T1-T\text{eng})/(T0-T\text{eng})]$$   (Formula 4)

Here, "log [ ]" denotes a natural logarithm function.

In the speed change inhibition time calculation means 119, a time period in which the motor coil temperature becomes the second predetermined temperature is calculated using the above Formula (4), on the basis of the motor coil temperature estimated by the coil temperature estimation means 117, the temperature inside the engine room as measured by the temperature sensor 121, and the known heat transfer rate λ and thermal capacity Ccoil measured beforehand. The calculated time period is given as the command of the speed change inhibition time period to the speed change control means 112.

As described above, owing to the configuration in which the speed change inhibition time period is calculated using Formula 4, it is possible to calculate the shortest time period in which the motor coil temperature becomes the second predetermined temperature or below, and it is possible to minimize the speed change inhibition time period.

Figure 9:
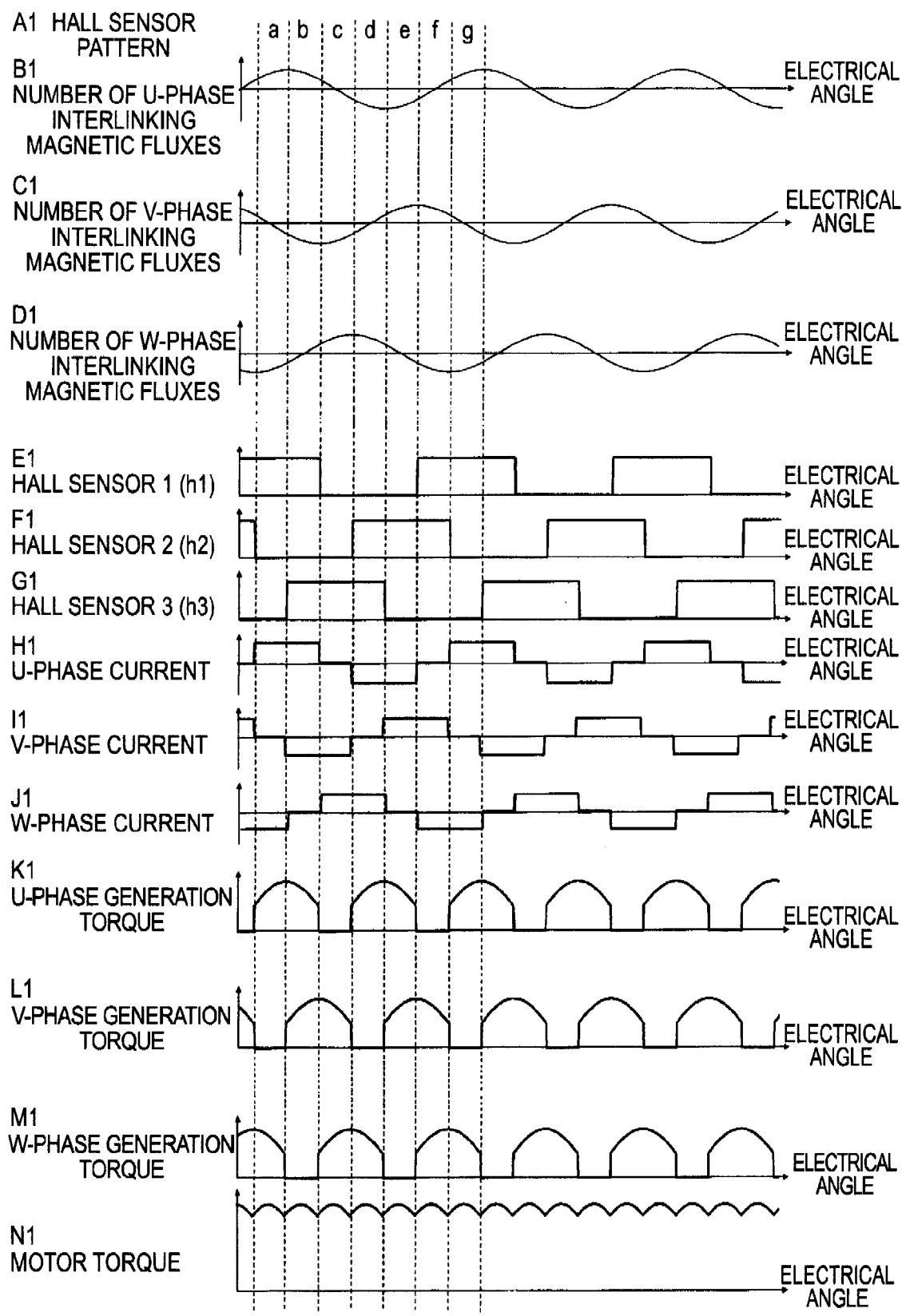
FIG. 9 is a diagram representing the torque generation mechanism of a brushless motor in an ordinary mode.

FIG. 9 is a diagram representing the torque generation mechanism of the brushless motor in an ordinary mode. Referring to FIG. 9, "A1" denotes a Hall sensor pattern, which is determined by the outputs E1, F1 and G1 of respective Hall sensors h1, h2 and h3, and as which six patterns a, b, c, d, e and f are existent. Incidentally, the outputs E1, F1 and G1 of the respective Hall sensors h1, h2 and h3 are determined by "Hi" (high) or "Lo" (low) in accordance with rotor positions.

"B1", "C1" and "D1" denote the numbers of the magnetic fluxes of a rotor side permanent magnet as pass through the coil arranged on the stator of the brushless motor, respectively. That is, "B1" denotes the number of U-phase interlinking magnetic fluxes, "C1" denotes the number of V-phase interlinking magnetic fluxes, and "D1" denotes the number of W-phase interlinking magnetic fluxes.

Besides, "H1", "I1" and "J1" denote currents which flow through the U-phase coil, V-phase coil and W-phase coil, respectively. Which of the phases the current is caused to flow through, is determined by the Hall sensor pattern A1. The current flows from the phase whose current value is plus, to the phase whose current value is minus. In a case, for example, where (h1, h2, h3)=(H, L, L) holds and where the Hall sensor pattern a is formed, the U-phase current becomes the plus value, and the W-phase current becomes the minus value. That is, the case of the Hall sensor pattern a indicates that the transistors UH and WL of the first inverter 403 or the second inverter 407 are turned ON, and that the current flows from the U-phase to the W-phase.

"K1" denotes a torque which is generated by the U-phase coil, and which is expressed by the product between the number of U-phase interlinking magnetic fluxes and the U-phase current. Likewise, "L1" denotes a torque which is generated by the V-phase coil, and which is expressed by the product between the number of V-phase interlinking magnetic fluxes and the V-phase current. Also, "M1" denotes a torque which is generated by the W-phase coil, and which is expressed by the product between the number of W-phase interlinking magnetic fluxes and the W-phase current.

"N1" denotes a motor torque, which is a torque generated by the brushless motor. The motor torque N1 becomes the sum of the torques generated by the respective phases as indicated by K1, L1 and M1.

As described above, in the 120-degree conduction, the conduction phases corresponding to the Hall sensor pattern are determined so that the motor torque may be maximized.

Figure 10:
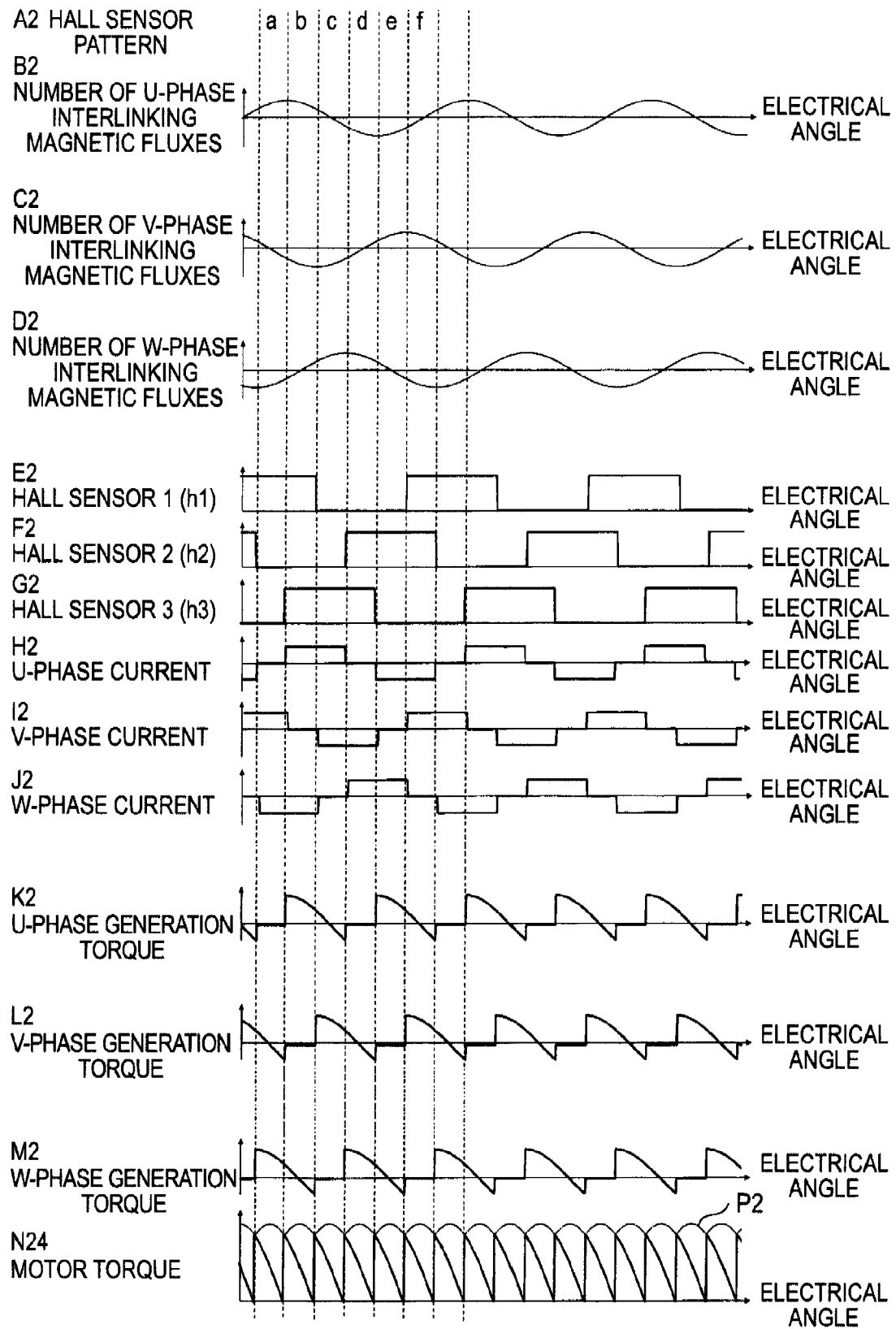
FIG. 10 is a diagram representing the torque generation mechanism of the brushless motor in the case where a generation torque is small.

FIG. 10 is a diagram representing the torque generation mechanism of the brushless motor in the case where a generation torque is small. Referring to FIG. 10, "A2" denotes a Hall sensor pattern, which is determined by the outputs E2, F2 and G2 of the respective Hall sensors h1, h2 and h3, and as which the six patterns a, b, c, d, e and f are existent. Incidentally, the outputs E2, F2 and G2 of the respective Hall sensors h1, h2 and h3 are determined by "Hi" (high) or "Lo" (low) in accordance with the rotor positions.

"B2", "C2" and "D2" denote the numbers of the magnetic fluxes of the rotor side permanent magnet as pass through the coil arranged on the stator of the brushless motor, respectively. That is, "B2" denotes the number of U-phase interlinking magnetic fluxes, "C2" denotes the number of V-phase interlinking magnetic fluxes, and "D2" denotes the number of W-phase interlinking magnetic fluxes.

Besides, "H2", "I2" and "J2" denote currents which flow through the U-phase coil, V-phase coil and W-phase coil, respectively. Which of the phases the current is caused to flow through, is determined by the Hall sensor pattern A2. The current flows from the phase whose current value is plus, to the phase whose current value is minus. In a case, for example, where (h1, h2, h3)=(H, L, L) holds and where the Hall sensor pattern a is formed, the V-phase current becomes the plus value, and the W-phase current becomes the minus value. That is, the case of the Hall pattern a indicates that the transistors VH and WL of the first inverter 403 or the second inverter 407 are turned ON, and that the current flows from the V-phase to the W-phase.

"K2" denotes a torque which is generated by the U-phase coil, and which is expressed by the product between the number of U-phase interlinking magnetic fluxes and the U-phase current. Likewise, "L2" denotes a torque which is generated by the V-phase coil, and which is expressed by the product between the number of V-phase interlinking magnetic fluxes and the V-phase current. Also, "M2" denotes a torque which is generated by the W-phase coil, and which is expressed by the product between the number of W-phase interlinking magnetic fluxes and the W-phase current.

"N2" denotes a motor torque, which is a torque generated by the brushless motor. The motor torque N2 becomes the sum of the torques generated by the respective phases as indicated by K2, L2 and M2. Incidentally, "P2" denotes the motor torque generated in the ordinary mode as shown in FIG. 9.

As described above, the difference between the motor torque generation mechanism in FIG. 10 and the motor torque generation mechanism in FIG. 9 is the conduction phase for the Hall sensor pattern A2. In the case of FIG. 9, the current flows from the U-phase to the W-phase on the occasion of the Hall sensor pattern a where (h1, h2, h3)=(H, L, L) holds. On the other hand, in the case of FIG. 10, the current flows from the V-phase to the W-phase on the occasion of the Hall sensor pattern a. Under the influence of the difference of the conduction phase, the motor torque N2 becomes a smaller value as compared with the motor torque P2 in the ordinary mode.

Figure 11:
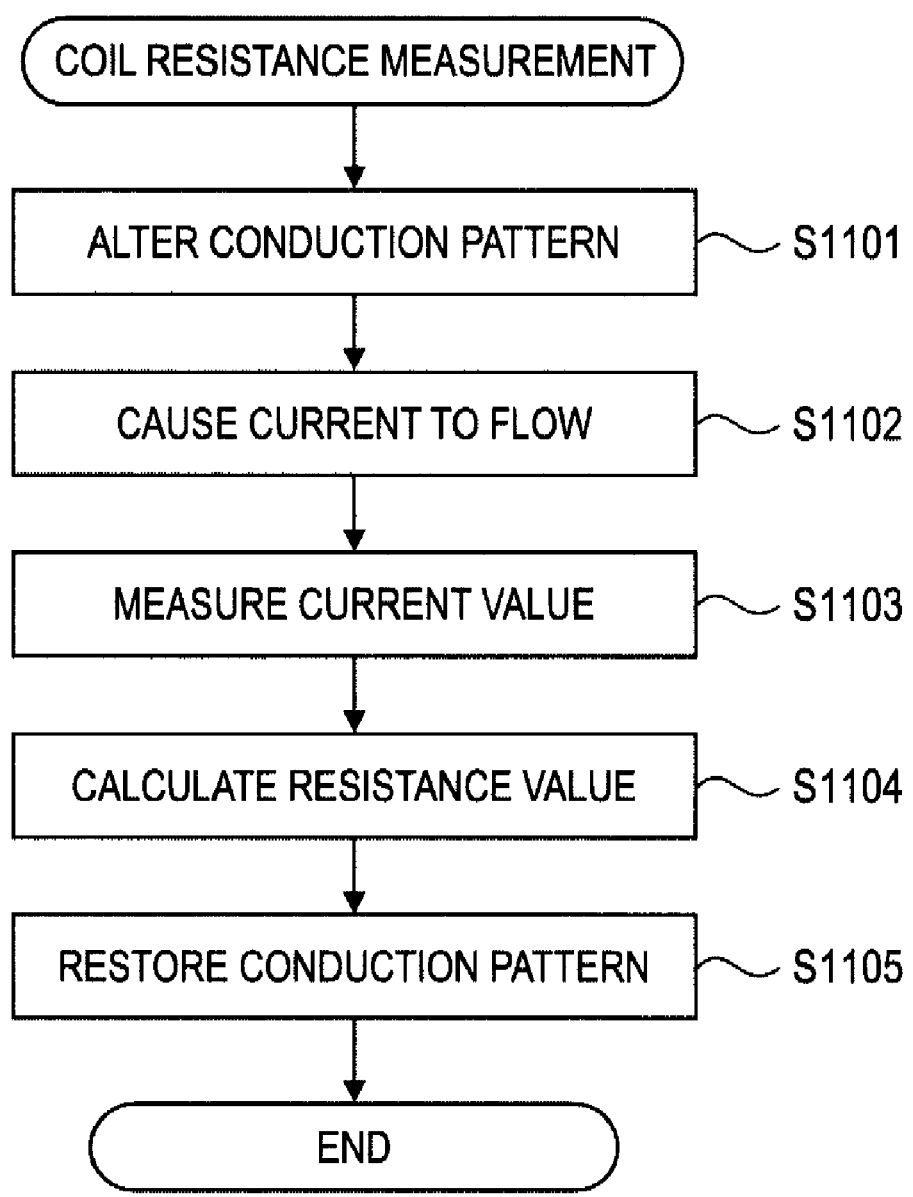
FIG. 11 is a diagram for explaining the details of a coil resistance measurement part.

FIG. 11 is a diagram for explaining the details of the coil resistance measurement part of the step S603 or S609 in FIG. 6. Referring to FIG. 11, at a step S1101, the correspondence between the Hall sensor pattern A1 and the conduction phase in the ordinary mode as shown in FIG. 9 is altered to the correspondence between the Hall sensor pattern A2 and the conduction phase as shown in FIG. 10, in the first conduction phase alteration means 401 or the second conduction phase alteration means 405 in FIG. 4, thereby to establish a resistance measurement mode. With, for example, the Hall sensor pattern a, the current is caused to flow from the U-phase to the W-phase in the ordinary mode, but the current is caused to flow from the V-phase to the W-phase in the resistance measurement mode.

At a step S1102, the transistor is PWM-driven so that the current may flow through the conduction phase determined at the step S1101. In a case, for example, where the current is caused to flow from the U-phase to the V-phase, the transistor UH of the first inverter 403 or the second inverter 407 is PWM-driven, and the transistor VL is turned ON. In this way, a voltage which is expressed by:

(Average voltage between Terminals)=(Voltage of DC power source 408 or 409)*Duty     (Formula 5)

is applied as the average voltage between the terminals of the shift direction motor 109 or the select direction motor 110, and the current flows through the coil.

At a step S1103, a current value is measured in accordance with the conducted phase, in the motor current measurement means 115. In a case, for example, where the conduction phase has been altered from the U-phase to the V-phase by the Hall sensor pattern, the current flowing through the U-phase is detected.

At a step S1104, a resistance value is calculated from the Ohm's law on the basis of the current value measured at the step S1103 and the applied average voltage value, in the coil resistance measurement means 116.

At a step S1105, the correspondence between the Hall sensor pattern and the conduction phase for the motor coil resistance measurement as shown in FIG. 10 is altered to the correspondence between the Hall pattern and the conduction phase as shown in FIG. 9, thereby to end the resistance measurement mode.

As described above, in the case of measuring the motor coil resistance, the relationship between the Hall sensor pattern and the conduction phase is altered so that the motor torque may become smaller. Thus, even when a voltage is applied to the shift direction motor 109 or the select direction motor 110 in the resistance measurement mode, the possibility of the erroneous revolution of the shift direction motor 109 or the select direction motor 110 can be lessened.

Besides, as stated before, the lamp 120a arranged within the meter 120 in FIG. 1 is lit up during the speed change inhibition time period given as the command by the speed change inhibition time calculation means 119. Thus, it can be notified to the driver that the transmission is in the speed change inhibition time period, and the incapability to perform the speed change can be prevented from being erroneously judged as a fault.

Thus far, this invention has been described by exemplifying the case where it is applied to the automatic transmission, but this invention can be utilized as a control apparatus for a transmission other than the automatic transmission, and the same advantages are attained. Therefore, this invention shall cover various alterations in design.

The control apparatus for the transmission according to this invention is utilized as a control apparatus for a transmission which is carried on an automobile or the like vehicle and in which a speed change is performed using a motor, thereby to lengthen the lifetime of the motor, and to achieve an industrial applicability.

Various modifications and alterations of this invention will be apparent to those skilled in the art without departing from the scope and spirit of this invention, and it should be understood that this invention is not limited to the illustrative embodiment set forth herein.

What is claimed is:

1. A control apparatus for a transmission in which a speed change control is performed by a motor, comprising:
    means for deciding if the transmission has undergone a gear change;
    means for measuring a coil resistance value of the motor which manipulates the transmission, when it is decided that the gear change has ended;
    means for estimating a coil temperature of the motor from the measured coil resistance value of the motor;
    means for deciding if the estimated coil temperature of the motor is a predetermined temperature or above; and
    means for calculating a speed change inhibition time period of the transmission when it is decided that the coil temperature of the motor is, at least, the predetermined temperature;
    wherein a speed change of the transmission is inhibited during the speed change inhibition time period.

2. A control apparatus for a transmission as defined in claim 1, wherein:
    when the speed change inhibition time period has ended, the coil resistance value is measured, and the coil temperature of the motor is estimated from the measured coil resistance value;
    the speed change is granted if the coil temperature of the motor is, at most, a second predetermined temperature which is lower than the predetermined temperature when the speed change inhibition time period is calculated; and
    when the coil temperature of the motor is higher than the second predetermined temperature, a speed change inhibition time period is calculated, and a speed change is inhibited.

3. A control apparatus for a transmission as defined in claim 1, further comprising means for measuring a temperature of an engine room in which an engine is accommodated, wherein the speed change inhibition time period is determined from the temperature of the engine room and the estimated coil temperature of the motor.

4. A control apparatus for a transmission as defined in claim 1, having a resistance measurement mode in which a current is caused to flow through a phase where a torque to be generated by the motor becomes smaller, in a case where the motor is a brushless motor and where a coil resistance is measured.

5. A control apparatus for a transmission as defined in claim 1, further comprising means, for notifying a speed change inhibition state to a driver, during the speed change inhibition time period.

6. A transmission control method in which a speed change control is performed by a motor, comprising:
    deciding if the transmission has undergone a gear change;
    measuring a coil resistance value of the motor which manipulates the transmission, when it is decided that the gear change has ended;
    estimating a coil temperature of the motor from the measured coil resistance value of the motor;
    deciding if the estimated coil temperature of the motor is a predetermined temperature or above; and
    calculating a speed change inhibition time period of the transmission when it is decided that the coil temperature of the motor is, at least, the predetermined temperature;
    wherein a speed change of the transmission is inhibited during the speed change inhibition time period.

7. The transmission control method as defined in claim 6, wherein:
    when the speed change inhibition time period has ended, the coil resistance value is measured, and the coil temperature of the motor is estimated from the measured coil resistance value;
    the speed change is granted if the coil temperature of the motor is, at most, a second predetermined temperature which is lower than the predetermined temperature when the speed change inhibition time period is calculated; and
    when the coil temperature of the motor is higher than the second predetermined temperature, a speed change inhibition time period is calculated, and a speed change is inhibited.

8. The transmission control method as defined in claim 6, further comprising measuring a temperature of an engine room in which an engine is accommodated, wherein the speed change inhibition time period is determined from the temperature of the engine room and the estimated coil temperature of the motor.

9. The transmission control method as defined in claim 6, further comprising a resistance measurement mode in which a current is caused to flow through a phase where a torque to be generated by the motor becomes smaller, in a case where the motor is a brushless motor and where a coil resistance is measured.

10. The transmission control method as defined in claim 6, further comprising notifying a speed change inhibition state to a driver during the speed change inhibition time period.

* * * * *